July 26, 1960 E. BERG 2,946,114

METHOD OF ASSEMBLING JUNCTION TRANSISTOR

Filed April 3, 1957

INVENTOR.
EINAR BERG
BY C. R. Sipe
ATTY.

2,946,114

METHOD OF ASSEMBLING JUNCTION TRANSISTOR

Einar Berg, Maywood, Ill., assignor to Automatic Electric Laboratories, Inc., a corporation of Delaware Filed Apr. 3, 1957, Ser. No. 650,346
1 Claim. (Cl. 29—25.3)

This invention relates to grown junction transistors and more particularly to methods for their assembly.

It is generally the practice in the assembly of the junction transistors to use a gold alloy wire of very small diameter (usually .002") to effect the base connection to the junction layer. The gold alloy wire had formed along its length a C or S bend and also had a sharply chiseled point formed at the tip of the wire. The opposite end of this formed and pointed wire is usually welded to a larger diameter nickel wire for support. The nickel wire is then held in a clamp of any general type. The clamp assembly is then moved in steps by micrometer adjustment in a direction parallel to the length of a semiconductor junction bar while the wire makes electrical contact with the bar. The pointed gold alloy wire is used as an electrical probe to indicate the proper location of the junction layer. When the wire is found to be in contact with the junction layer, the wire is then welded to the junction. The clamp is then removed from the nickel wire and the nickel wire is then usually molded into a plastic block or welded to the terminal of a commercial header.

It is the purpose of my invention to eliminate the intermediate step, as set out previously, of welding a nickel wire to support the gold wire.

An object of the present invention is a method of holding the gold wire itself during the positioning of the wire adjacent the junction layer.

A further object is to connect an end of the gold wire directly to the terminal of a header after the opposite end has been welded to the junction layer.

Figure 1:
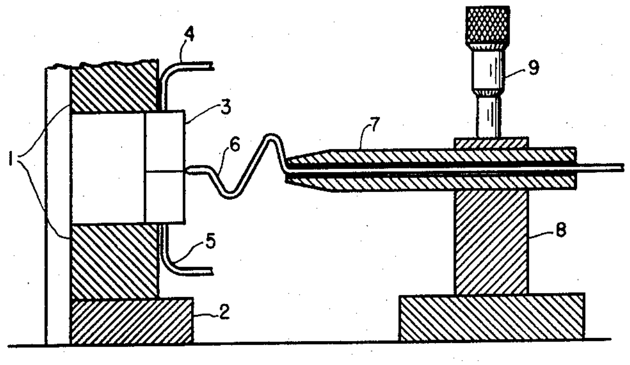

The method of performing this operation will be more readily understood in view of the drawings. Fig. 1 shows the first step in the process, Fig. 2 the next step and Fig. 3 shows the transistor produced.

Figure 2:
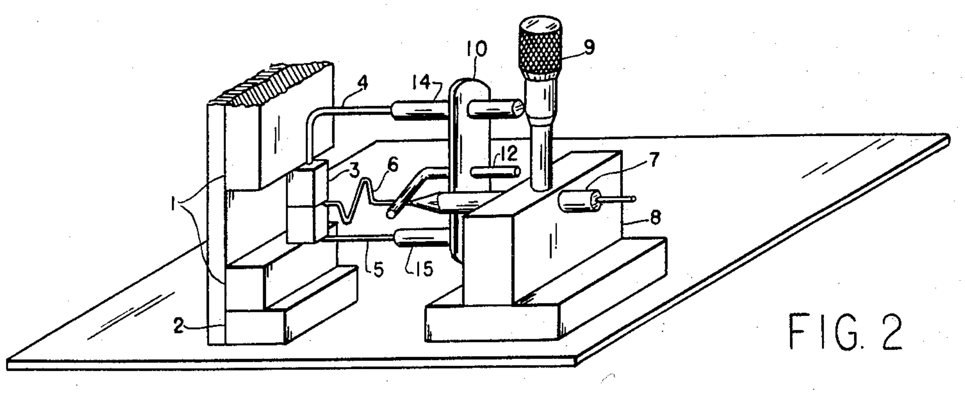

In Fig. 1, junction block 3 with its lead wires 4 and 5 already in place is shown being held in clamping device 1 which may be any suitable holding device. Lead wires 4 and 5 are shown in broken section in Fig. 1; however as can be seen in Fig. 2 these wires have already been connected to leads 14 and 15 of header 10. Header 10 has been deleted from Fig. 1 to more clearly show the substance of the invention. Gold wire is held in a tubular wire guide 7 which has a close tolerance relationship to the wire, in order to firmly hold the wire in place. Wire 6 has been formed into the characteristic S curve and has been chisel pointed at its outer tip. The wire is held in the guide at the neck of the S curve so the wire cannot slip back into the guide. Guide 7 can be moved vertically by micrometer adjusting screw 9 in order to probe junction block 3 for the junction layer. The electronic means used for determining the exact location of the junction layer are generally well-known and require no further exposition here. When it has been determined that the junction layer has been found, wire 6 is then welded to the junction.

In Fig. 2, after the wire has been welded to block 3, wire guide 7 is slid back exposing a length of gold wire. A connection is then made between the exposed portion of the wire and the header terminal 12. Wire 6 is then directly welded to terminal 12 of header 10 at the connection. The gold alloy wire is then cut at the mouth of wire guide 7 and the completed unit is then removed from the assembly fixture.

Figure 3:
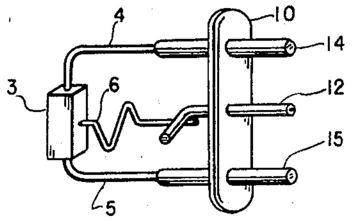

Fig. 3 is the finished product having the gold wire alone connecting junction block 6 to terminal 12.

What is claimed is:

A method for assembling electrodes to grown junction transistors comprising the steps of: firmly positioning a transistor junction block; slidably holding a gold wire of predetermined length by surrounding a predetermined lineal portion thereof to prevent lateral movement and with a predetermined free end portion; forming a point on the free end of the wire; thereafter forming a sigmoid curve between said point and said lineal portion; applying a longitudinal force substantially along the axis of said lineal portion against said curved portion to bring said point into firm contact with a surface of said transistor junction block; applying a lateral force along the entire lineal portion to impart lateral movement to the entire wire relative to said transistor junction block for positioning said point at the precise junction layer thereof; bonding said point to said junction block at said junction layer; exposing part of said lineal portion; and forming a permanent electrical connection between said exposed portion of said wire and a terminal on a header.

References Cited in the file of this patent
UNITED STATES PATENTS
2,748,235 Wallace ............... May 29, 1956